United States Patent [19]

Weisbrich

[11] 4,332,518

[45] Jun. 1, 1982

[54] MULTIFUNCTIONAL TARP ROTOR STRUT VANES

[76] Inventor: Alfred L. Weisbrich, 76 Mayflower Rd., Windsor, Conn. 06095

[21] Appl. No.: 273,006

[22] Filed: Jun. 12, 1981

Related U.S. Application Data

[63] Continuation-in-part of Ser. No. 971,924, Dec. 21, 1978, Pat. No. 4,288,199.

[51] Int. Cl.³ .............................................. F03D 1/02
[52] U.S. Cl. .................................. 415/2 R; 415/142; 416/9
[58] Field of Search .................................. 415/2–4 R, 415/2–4 A, 142; 416/9

[56] References Cited

U.S. PATENT DOCUMENTS

| | | | |
|---|---|---|---|
| 4,021,140 | 5/1977 | Weisbrich | 415/2 X |
| 4,084,918 | 4/1978 | Pavlecka | 415/2 R X |
| 4,156,579 | 5/1979 | Weisbrich | 415/2 A |
| 4,156,580 | 5/1979 | Pohl | 415/2 R |
| 4,288,199 | 9/1981 | Weisbrich | 415/2 R |

*Primary Examiner*—Everette A. Powell, Jr.

[57] ABSTRACT

Presented is a singular device for providing multifunctional means as a fluid impeller or rotor support structure, fluid actuated yaw positioning, and stabilizing means and TARP augmented flow directing or channelling means about a TARP.

10 Claims, 4 Drawing Figures

MULTIFUNCTIONAL TARP ROTOR STRUT VANES

This application is a continuation-in-part application of the Toroidal Accelerator Rotor Platform (TARP) Rotor Yaw Track Means application, Ser. No. 971,924 filed Dec. 21, 1978, now U.S. Pat. No. 4,288,199, dated Sept. 8, 1981.

BACKGROUND OF THE INVENTION

The cost of energy produced by flow energy extraction and conversion devices is directly proportional to their capital cost and inversely proportional to their performance. A means to reduce energy cost is thereby to reduce a system's capital cost, increase its performance, or do both. It is possible to reduce the capital cost and/or enhance performance of a system when several useful and/or required functions, normally necessitating discrete, separate and dedicated components or sub-assemblies, can be carried out by a single structural entity.

An example of this is illustrated by the TARP system toroid body. This single structure is designed to provide not only a means for supporting and shielding impellers in its peripheral flow channel, but simultaneously said structure provides a housing function means internally under applications as well as performance enhancing flow augmentation means to its impellers. Similarly, the present invention as part of the TARP system, provides multiple function service to accomodate reduced capital cost requirements as well as provide performance enhancement to improve cost of energy.

The device connecting an impeller, for example horizontal axis rotor, within the TARP peripheral channel to the TARP flow augmentor body and yaw track means is designed to provide not only effective support for a rotor within the flow channel, but it is simultaneously designed to aid rotor yaw response to flow directional changes, provide enhanced yaw stability and control via thrust differentiation between each rotor system of a TARP's interconnected twin rotor system and furthermore to provide peripheral TARP flow channeling means to enhance performance of the system.

The latter invention is henceforth designated as multi-functional TARP rotor strut vanes.

SUMMARY OF THE INVENTION

In accordance with the present invention, the TARP, being a flow augmentor structure, provides for a means that can function and serve simultaneously as a rotor support means attaching a rotor assembly to the TARP rotor yaw track, if any, and TARP structure, as a fluid-dynamic rotor system yaw positioning, stabilizer and control means together with rotor braking, and as a flow directing or channelling means of peripheral TARP augmented flow for system performance enhancement.

DESCRIPTION

Figure 1:
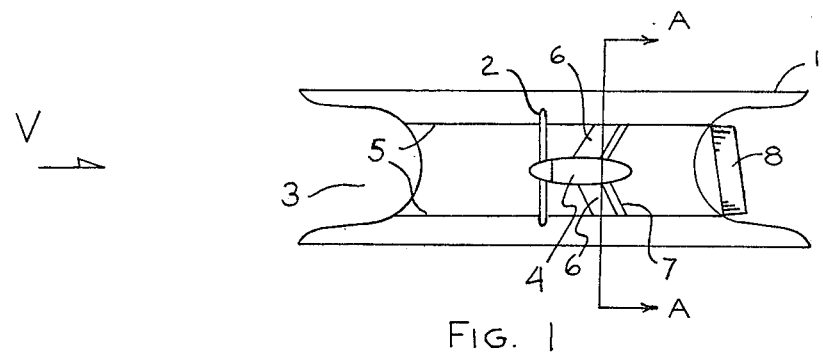
FIG. 1 is an elevation side view of a TARP embodying the invention.
Figure 2:
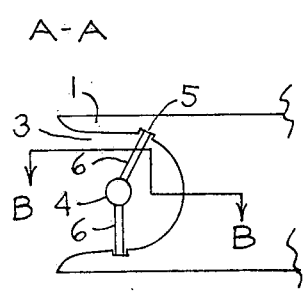
FIG. 2 is a sectional view taken along line A—A in FIG. 1.
Figure 4:
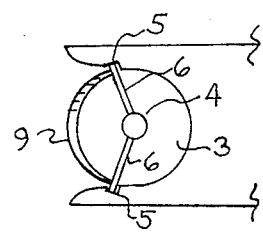
FIG. 4 is a modification to FIG. 3 showing attachment of rotor shroud shells to rotor strut vanes.
Figure 3:
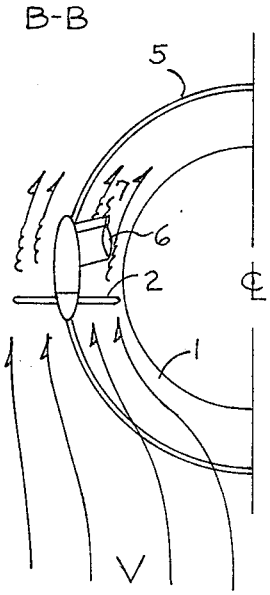
FIG. 3 is a sectional view taken along line B—B in FIG. 2.

Referring to FIG. 1, a TARP, 1 embodying the invention is illustrated incorporating interconnected rotatable fluid impact impellers 2, horizontal axis rotors in this illustration, a second rotor being obstructed from view on the opposite side of the TARP, said impellers within TARP fluid channel means 3 about the periphery of said TARP 1, and said impellers 2, illustrated connected to a generator drive system within nacelle structure 4, and said impellers and associated nacelle structure supported by and attached to and yawed and yaw-stabilized about yaw track interface 5 by the present invention, the TARP rotor strut vane means 6, the latter 6 furthermore directing or channeling flow about said TARP 1 aft of the rotor 2 with optional pitchable surface 7. Yaw enhancement drag or blockage means 8, being illustrated interconnected and supported by TARP 1 and track means 5 together with impellers 2 and nacelle 4 and substantially located peripheral to TARP structure 1. Referring to FIG. 2 TARP rotor strut vanes 6 are illustrated substantially sectionally edgewise within the TARP peripheral flow channel showing support of impeller-nacelle 4 assembly and interconnection with rotor yaw track means 5. Referring to FIG. 3 TARP rotor strut vane 6 is sectionally illustrated in plan view showing fluid flow directing means by said vane 6 to affect improved system performance and system yaw control and stability via fluid flow modification. TARP rotor strut vane 6 is shown with optional pitchable surface 7 for added flow modification control. Referring to FIG. 4, TARP rotor strut vanes are illustrated serving as an attachment for rotor shroud shells 9 as a modification to sectional view FIG. 2.

Many modifications, embodiments, and changes will be evident as for example specific shape, configuration, number, and material of the TARP rotor strut vanes integrated into a TARP system for interconnected impeller system support, yaw actuation, yaw stability, and flow directing means, while still remaining within the scope and spirit of the invention.

What I claim is:

1. A power generating device comprising:
   a fluid flow velocity augmentor structure means being substantially the shape of a concentric interior section of a hollow toroid of general arbitrary cross-section in both a vertical and horizontal planes, meaning that in both a vertical and horizontal plane cross-sections may not be limited to circular arc and circular sections respectively, providing thereby open peripheral fluid flow channel means and defining augmented flow velocity regions about the exterior periphery of said fluid flow augmentor structure wherein a plurality of interconnected fluid impact impellers are mounted within said peripheral fluid flow channel;
   plural multi-functional support strut vane means, mounted between the fluid flow augmentor structure and peripheral fluid impact impeller assembly for support and attachment of said fluid impact impeller system to said fluid flow augmentor structure, and as a fluid dynamic impeller system yaw positioning, stabilizer and control means, and as a flow channeling means of augmented flow about the peripheral fluid flow augmentor channel means.

2. A power generating device according to claim 1 wherein said multi-functional strut vane means are comprised of streamlined surfaces with attached pitchable surfaces.

3. A power generation device according to claim 1 wherein said multi-functional strut vane means are comprised of streamlined surfaces and attachment support for rotor shroud shell means.

4. A power generating device according to claim 1 wherein said multi-functional strut vane means attach and interfaces with yaw track means for yaw upon said track means about said fluid flow augmentor structure in response to fluid flow.

5. A power generating device according to claim 2 wherein said multi-functional strut vane means attach and interface with yaw track means for yaw upon said track means about said fluid flow augmentor structure in response to fluid flow.

6. A power generating device according to claim 4 wherein said multi-functional strut vane means are comprised of streamlined surfaces which provide attachment support for rotor shroud shell means.

7. A power generating device according to claim 2 wherein said multi-functional strut vane means are furthermore to provide attachment support for rotor shroud shell means.

8. A power generating device according to claim 7 wherein said multi-functional strut vane means attach and interface with yaw track means for yaw upon said track means about said fluid flow augmentor structure in response to fluid flow.

9. A power generating device according to claim 1 wherein said fluid flow impact impellers are substantially two horizontal axis rotors.

10. A power generating device according to claim 8 wherein said fluid flow impact impellers are substantially two horizontal axis rotors.

* * * * *